United States Patent
Byun

(10) Patent No.: US 11,625,178 B2
(45) Date of Patent: Apr. 11, 2023

(54) STORAGE DEVICE AND METHOD OF OPERATING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 27 days.

(21) Appl. No.: 17/326,631

(22) Filed: May 21, 2021

(65) Prior Publication Data
US 2022/0155957 A1    May 19, 2022

(30) Foreign Application Priority Data
Nov. 16, 2020 (KR) .................. 10-2020-0152997

(51) Int. Cl.
*G06F 3/06* (2006.01)
(52) U.S. Cl.
CPC ............ *G06F 3/064* (2013.01); *G06F 3/0619* (2013.01); *G06F 3/0631* (2013.01); *G06F 3/0656* (2013.01); *G06F 3/0679* (2013.01)
(58) Field of Classification Search
CPC ...... G06F 3/064; G06F 3/0619; G06F 3/0631; G06F 3/0656; G06F 3/0679; G06F 3/0644; G06F 11/1458; G06F 11/1666
See application file for complete search history.

(56) References Cited

U.S. PATENT DOCUMENTS

2021/0373802 A1* 12/2021 Helmick ............... G06F 3/0688

FOREIGN PATENT DOCUMENTS

| KR | 10-0843543 B1 | 7/2008 |
| KR | 10-2019-0092054 A | 8/2019 |

OTHER PUBLICATIONS

Woosuk Chung, Benefits of ZNS in Datacenter Storage Systems, Virtual Conference & Expo, Nov. 10-12, 2020, FlashMemorySummit.com.

* cited by examiner

*Primary Examiner* — David Yi
*Assistant Examiner* — Dustin B. Fulford
(74) *Attorney, Agent, or Firm* — IP & T Group LLP

(57) ABSTRACT

The present technology relates to an electronic device. According to the present technology, a storage device having improved zone recovery speed may include a memory device including a plurality of memory blocks, and a memory controller configured to, in response to the zone open request, allocate memory blocks to store data of a logical address group corresponding to an open-requested zone among the plurality of memory blocks, and control the memory device to store zone recovery information included in a zone open request, and wherein the zone recovery information indicates whether data to be stored in the open-requested zone is to be recovered in a next power cycle.

20 Claims, 13 Drawing Sheets

| | Zone # | Zone State | Write Pointer | Start Address | Zone Capacity |
|---|---|---|---|---|---|
| Zone Descriptor 0 | Zone 0 | Open | LBA 5 | LBA 0 | Capacity 1 |
| | Zone 1 | Closed | LBA 43 | LBA 20 | Capacity 2 |
| ⋮ | Zone 2 | Closed | LBA 77 | LBA 50 | Capacity 3 |
| | Zone 3 | Open | LBA 90 | LBA 90 | Capacity 4 |
| Zone Descriptor 4 | Zone 4 | Open | LBA 100 | LBA 100 | Capacity 5 |
| | ⋮ | ⋮ | ⋮ | ⋮ | ⋮ |

| Zone # | Recovery Information |
|---|---|
| Zone 0 | Recovery |
| Zone 1 | No Recovery |
| Zone 2 | Recovery |
| Zone 3 | Recovery |
| Zone 4 | No Recovery |
| ⋮ | ⋮ |

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0152997, filed on Nov. 16, 2020, which is incorporated by reference herein in its entirety.

BACKGROUND

Field of Invention

One or more embodiments described herein relate to a storage device and a method of operating a storage device.

Description of Related Art

A storage device may include a memory controller that controls storage of data in memory device at the direction of a host. Examples of a host include a computer and smart phone.

The memory device may be a volatile memory device or a nonvolatile memory device. A volatile memory device stores data only when power is supplied and loses the stored data when the power supply is cut off. Examples of a volatile memory device include a static random access memory (SRAM) and a dynamic random access memory (DRAM).

A nonvolatile memory device stores data even when power is cut off. Examples of a nonvolatile memory device include a read only memory (ROM), a programmable ROM (PROM), an electrically programmable ROM (EPROM), an electrically erasable and programmable ROM (EEPROM), and a flash memory.

SUMMARY

One or more embodiments described herein provide a storage device having an improved zone recovery speed, and a method of operating a storage device to achieve the same.

According to an embodiment of the present disclosure, a storage device may include a memory device including a plurality of memory blocks, and a memory controller configured to, in response to the zone open request, allocate memory blocks to store data of a logical address group corresponding to an open-requested zone among the plurality of memory blocks, and control the memory device to store zone recovery information included in a zone open request, and wherein the zone recovery information indicates whether data to be stored in the open-requested zone is to be recovered in a next power cycle.

According to an embodiment of the present disclosure, a storage device may include a memory device including a plurality of zones respectively corresponding to logical address groups, each of the logical address groups including successive logical addresses and a meta data block storing meta data related to the plurality of zones, a buffer memory device configured to temporarily store data received from a source device or the memory device and a memory controller configured to, when power is applied, load zone recovery information included in the meta data block into the buffer memory device, and to selectively recover data stored in the plurality of zones based on the zone recovery information.

According to an embodiment of the present disclosure, a storage device may include a memory device including a plurality of zones configured to store data corresponding to logical address groups, each of the logical address groups including successive logical addresses, a buffer memory device including a zone recovery information storage configured to store zone recovery information indicating volatile zones among the plurality of zones and a memory controller configured to: store, in a meta data block included in the memory device, data stored in the zone recovery information storage before power is cut off, load, into the zone recovery information storage, zone recovery information stored in the meta data block, when power is supplied again after the power is cut off and recover, based on the zone recovery information, data stored in one or more zones other than the volatile zones among the plurality of zones.

According to an embodiment of the present disclosure, an apparatus may include a storage area configured to store instructions and a memory controller configured to execute the instructions to control a memory device to perform an allocation operation and a storage operation, the allocation operation including allocating memory blocks to store data of a logical address group corresponding to an open-requested zone and the storage operating including storing zone recovery information in a zone open request, wherein the memory controller is configured to perform the allocation operation and the storage operation in response to the zone open request, and the zone recovery information indicates whether data to be stored in the open-requested zone is to be recovered in a next power cycle.

According to an embodiment of the present disclosure, A non-transitory computer-readable medium configured to store instructions, the instructions, when executed by one or more processors, causing the one or more processors to control a memory device to perform an allocation operation and a storage operation, wherein the allocation operation includes allocating memory blocks to store data of a logical address group corresponding to an open-requested zone and the storage operating including storing zone recovery information in a zone open request, the allocation operation and the storage operation are to be performed in response to the zone open request, and the zone recovery information indicates whether data to be stored in the open-requested zone is to be recovered in a next power cycle.

BRIEF DESCRIPTION OF THE DRAWINGS

FIG. 7 illustrates examples of zone descriptors.
FIG. 8 illustrates an example of zone recovery information stored in a zone recovery information storage.

DETAILED DESCRIPTION

Structural or functional descriptions of embodiments according to the present application are illustrated only to describe the embodiments according to the concept of the present disclosure. The embodiments may be carried out in various forms and are not limited to the embodiments described in the present specification or application.

Figure 1:
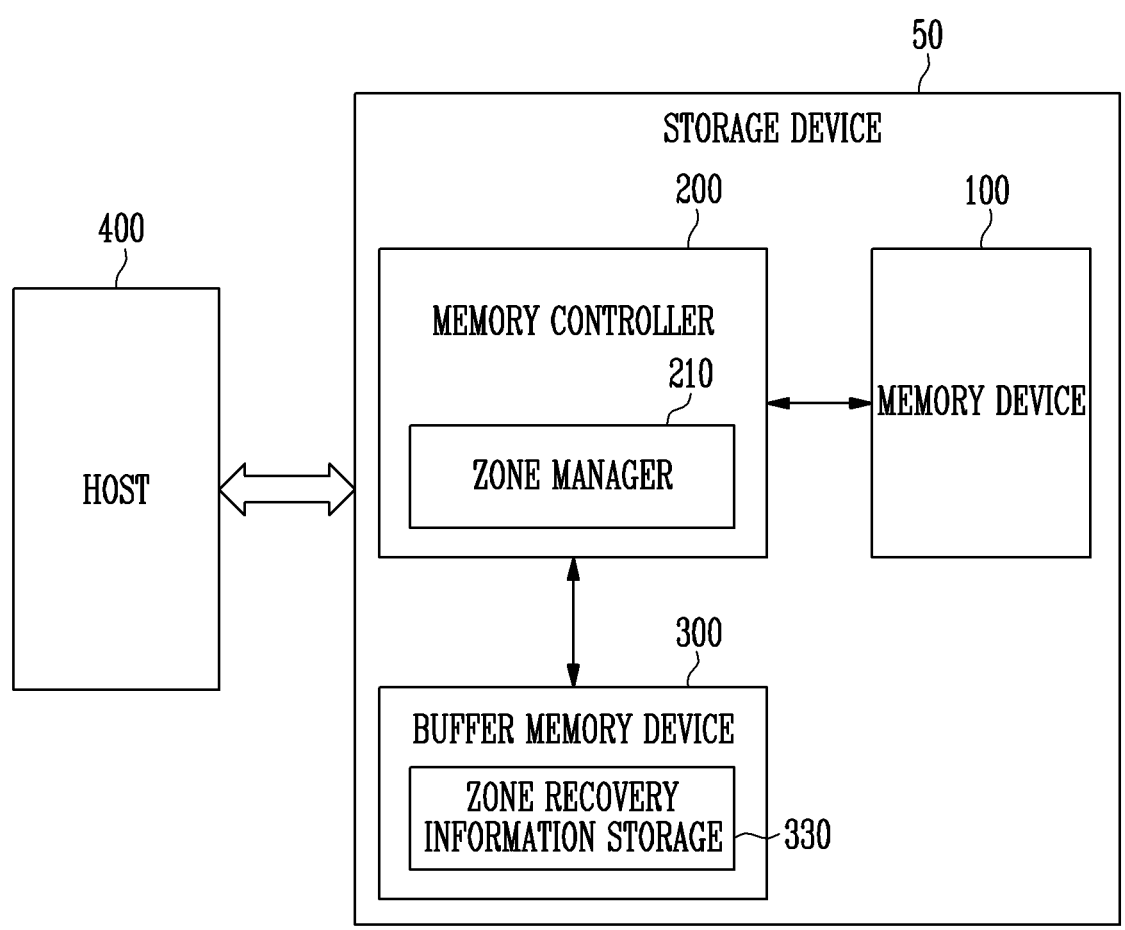
FIG. 1 illustrates an embodiment of a storage device.

FIG. 1 is a diagram illustrating an embodiment of a storage device 50, which may include a memory device 100 and a memory controller 200 that controls an operation of the memory device. The storage device 50 may be a device that stores data under control of a host 400. Examples of the host 400 include a cellular phone, a smartphone, an MP3 player, a laptop computer, a desktop computer, a game player, a TV, a tablet PC, and an in-vehicle infotainment system.

The storage device 50 may be one of various types of storage devices, for example, according to a communication method of an interface corresponding to the host 400. Examples include an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be any one of various types of packages. Examples include a package on package (POP), a system in package (SIP), a system on chip (SOC), a multi-chip package (MCP), a chip on board (COB), a wafer-level fabricated package (WFP), and a wafer-level stack package (WSP).

The memory device 100 stores data and may operate under control of the memory controller 200. The memory device 100 may include a memory cell array including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) that stores four data bits.

The memory cell array may include a plurality of memory blocks, each of which may include a plurality of pages. In an embodiment, a page may be a unit for storing data in the memory device 100 or for reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (ReRAM), a phase-change random access memory (PRAM), a magnetoresistive random access memory (MRAM), a ferroelectric random access memory (FRAM), a spin transfer torque random access memory (STT-RAM), or the like. For convenience of description, it is assumed that the memory device 100 is a NAND flash memory.

The memory device 100 is configured to receive commands and addresses from the memory controller 200 and access areas selected by corresponding ones of the addresses in the memory cell array. The memory device 100 may perform operations instructed by commands on the areas selected by the addresses. Examples of the operations include a write operation (program operation), a read operation, and an erase operation. During a program operation, the memory device 100 may program data to the area selected by an address. During a read operation, the memory device 100 may sense data from the area selected by an address. During an erase operation, the memory device 100 may erase data stored in the area selected by an address.

The memory controller 200 may control overall operation of the storage device 50. When power is applied to the storage device 50, the memory controller 200 may execute instructions, e.g., firmware (FW). When the memory device 100 is a flash memory device, the firmware (FW) may include a host interface layer (HIL) that controls communication with the host 400. The memory controller may include a flash translation layer (FTL) that controls communication between the host 400 and the memory device 100, and a flash interface layer (FIL) that controls communication with the memory device 100.

In an embodiment, the memory controller 200 may receive data and a logical block address (LBA) from the host 400. The memory controller 200 may then convert the LBA to a physical block address (PBA), indicating an address of one or more memory cells in which data in the memory device 100 is to be stored. In one embodiment, the terms LBA, logic address, and logical address may be used synonymously, and the terms PBA and physical address may be used synonymously.

The memory controller 200 may control the memory device 100 to perform program operations, read operations, erase operations, and other operations according to requests from the host 400. During a program operation, memory controller 200 may provide a write command, PBA, and data to the memory device 100. During a read operation, memory controller 200 may provide a read command and PBA to memory device 100. During an erase operation, memory controller 200 may provide an erase command and PBA to the memory device 100.

In an embodiment, the memory controller 200 may generate commands, addresses, and data independently from requests from the host 400, and may transmit the commands, addresses, and data to the memory device 100. For example, the memory controller 200 may provide commands, addresses, and/or data for performing read and program operations for wear leveling, read reclaim, garbage collection, etc., to the memory device 100.

In an embodiment, the memory controller 200 may control two or more memory devices 100. In this case, the memory controller 200 may control the memory devices 100, for example, according to an interleaving method in order to improve operation performance. The interleaving method may be a method of controlling operations for at least two memory devices 100 to overlap with each other.

According to an embodiment, the memory device 100 may include a sequential area, which, for example, may be a storage area that stores data corresponding to a logical address group that includes successive logical addresses input from the host 400. Such a sequential area may be referred to, for example, as a "zone". In one embodiment, the memory device 100 may include a plurality of zones, with each zone storing data of a corresponding logical address group.

The memory controller 200 may further include a zone manager 210. The zone manager 210 may receive a zone open request provided when the host 400 first opens the zone. The zone open request may include zone recovery information for a corresponding zone. The zone recovery information may be information indicating whether data stored in the corresponding zone is data that is to be recovered at a next power cycle (e.g., a state in which power is supplied again after power is cut off).

The zone manager 210 may store the zone recovery information, which is stored in the zone recovery information storage 330, in the memory device 100 periodically or before power is cut off.

Thereafter, when power is input, the zone manager 210 may load the zone recovery information from the memory device 100 to store the zone recovery information into zone recovery information storage 330, and selectively recover only zones that are to be recovered (from among a plurality of zones) based on the zone recovery information. In an embodiment, the zone manager 210 may control the memory device 100 to erase data stored in zones that are not the zones that are to be recovered.

The buffer memory device 300 may be an area that temporarily stores data provided from a source device such as the host 400 or that temporarily stores data obtained from the memory device 100. For example, the buffer memory device 300 may temporarily store data requested to be written from the host 400 before storing the data in the memory device 100. In one embodiment, the buffer memory device 300 may temporarily store data read from the memory device 100 before providing the data to the host 400.

When storage device 50 stores data in the plurality of zones, host 400 may store data for improving performance of the host 400 or the storage device 50 in the storage device 50, rather than user data that a user desires to store in the storage device 50. Such data may not be permanently stored in the storage device 50 and may be data generated every power cycle.

When the host 400 stores data and indicates that the data is not necessarily required to be recovered, storage device 50 may selectively recover zones including previously stored data after power is applied. Thus, the time for performing a recovery operation may be reduced.

For example, when host 400 opens a zone, the host 400 may provide storage device 50 with zone recovery information indicating that data (not required to be recovered in the next power cycle) is not a recovery target. Zones that are not to be recovered may be used as so-called volatile zones, e.g., ones that store data that is destroyed every power cycle. The zones to be recovered may be used as nonvolatile zones.

The host 400 may communicate with the storage device 50 using at least one of various communication methods. Examples include a universal serial bus (USB), a serial AT attachment (SATA), a serial attached SCSI (SAS), a high speed interchip (HSIC), a small computer system interface (SCSI), a peripheral component interconnection (PCI), a PCI express (PCI-E), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
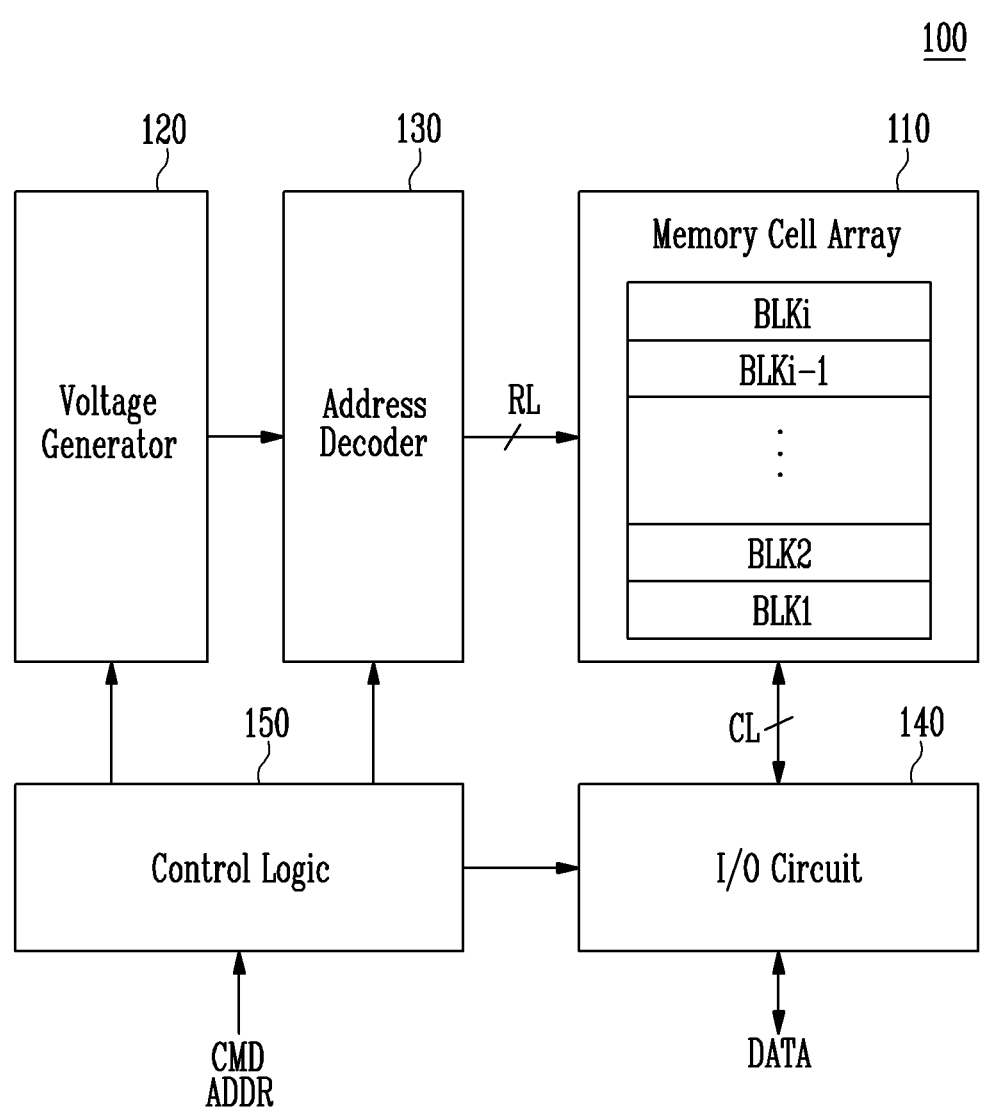
FIG. 2 illustrates an embodiment of a memory device.

FIG. 2 is a diagram illustrating an embodiment of memory device 100, which may include a memory cell array 110, a voltage generator 120, an address decoder 130, an input/output circuit 140, and a control logic 150.

The memory cell array 110 includes a plurality of memory blocks BLK1 to BLKi connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the memory blocks BLK1 to BLKi may include a plurality of memory cells. In an embodiment, the memory cells may be nonvolatile memory cells. Memory cells connected to the same word line may correspond to one physical page. For example, the memory cell array 110 may include a plurality of physical pages. Each of the memory cells of memory device 100 may be configured as an SLC that stores one data bit, an MLC that stores two data bits, a TLC that stores three data bits, or a QLC capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive memory cell array 110 to perform program operations, read operations, and erase operations.

The voltage generator 120 is configured to generate a plurality of operation voltages Vop based on an external power voltage supplied to the memory device 100. The voltage generator 120 operates in response to control of the control logic 150.

As an embodiment, the voltage generator 120 may generate an internal power voltage by regulating the external power voltage. The internal power voltage generated by the voltage generator 120 may be used as an operation voltage of memory device 100.

In an embodiment, the voltage generator 120 may generate operation voltages based on an external power voltage and/or an internal power voltage. The voltage generator 120 may be configured to generate various voltages in the memory device 100. For example, the voltage generator 120 may generate a plurality of erase voltages, a plurality of program voltages, a plurality of pass voltages, a plurality of selected read voltages, and/or a plurality of unselected read voltages.

The voltage generator 120 may include a plurality of pumping capacitors that receive the internal power voltage and generate the operation voltages having various voltage levels. In one embodiment, voltage generator 120 may generate the operation voltages by selectively activating the pumping capacitors in response to control of the control logic 150. The generated operation voltages may be supplied to the memory cell array 110 by the address decoder 130.

The address decoder 130 is connected to the memory cell array 110 through the row lines RL. The address decoder 130 may be configured to operate in response to control of the control logic 150. The address decoder 130 may receive one or more addresses ADDR from the control logic 150. The address decoder 130 may decode a block address among the received addresses ADDR. The address decoder 130 selects at least one memory block (among the memory blocks BLK1 to BLKi) according to the decoded block address.

The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

According to an embodiment, during a read operation, the address decoder 130 may apply a read voltage to a selected word line and a read pass voltage of a level different from (e.g., higher than) that of the read voltage to unselected word lines. For example, the address decoder 130 may include components such as a row decoder, a column decoder, and an address buffer.

The input/output circuit 140 may include a plurality of page buffers connected to the memory cell array 110 through the bit lines. During a program operation, data may be stored in selected memory cells according to data stored in the page buffers.

During a read operation, data stored in the selected memory cells may be sensed through the bit lines and the sensed data may be stored in the page buffers.

Control logic 150 may control the address decoder 130, the voltage generator 120, and the input/output circuit 140. The control logic 150 may operate, for example, in response to the command CMD transmitted from an external device. The control logic 150 may generate various signals in response to the command CMD and one or more addresses ADDR to control the peripheral circuits.

Figure 3:
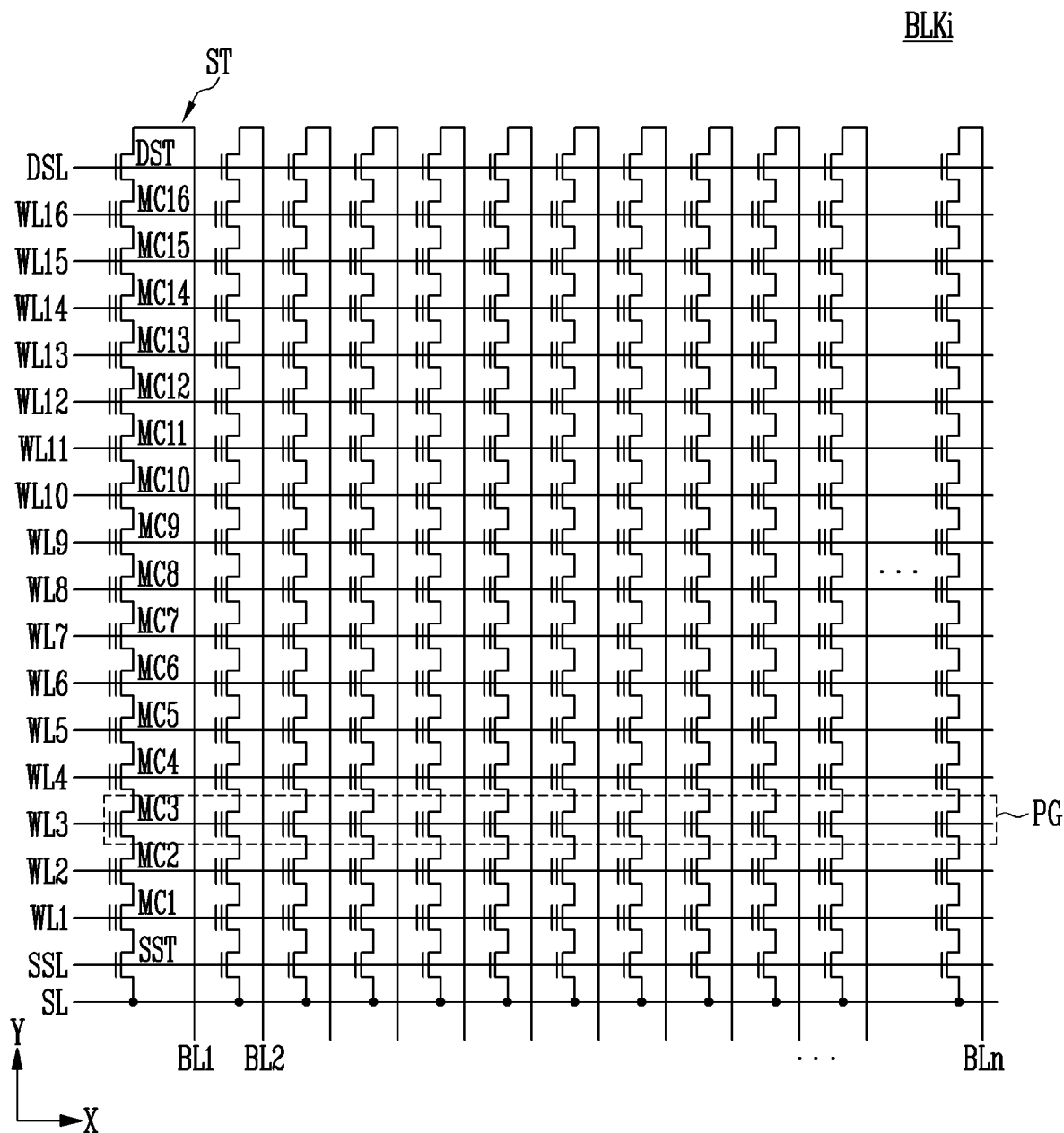
FIG. 3 illustrates an embodiment of a memory block.

FIG. 3 is a diagram illustrating an embodiment of a memory block BLKi, which, for example, may be representative of the memory blocks BLK1 to BLKi of FIG. 2.

Referring to FIG. 3, a plurality of word lines arranged in parallel with each other may be connected between a first select line and a second select line. The first select line may be the source select line SSL, and the second select line may be the drain select line DSL. For example, the memory block BLKi may include a plurality of strings ST connected between the bit lines BL1 to BLn and a source line SL. The bit lines BL1 to BLn may be connected to the strings ST, respectively. The source line SL may be commonly connected to the strings ST. The strings ST may be configured to be the same or similar to each other. In this case, description of a string ST connected to the first bit line BL1 may be discussed as a representative example.

The string ST may include a source select transistor SST, a plurality of memory cells MC1 to MC16, and a drain select transistor DST connected in series between the source line SL and the first bit line BL1. One string ST may include one or more of the source select transistor SST or the drain select transistor DST. Also, in one embodiment, a number of memory cells different from memory cells MC1 to MC16 may be included in one embodiment.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of the source select transistors SST in the different strings ST may be connected to the source select line SSL. Gates of the drain select transistors DST may be connected to the drain select line DSL. Gates of the memory cells MC1 to MC16 may be connected to the plurality of word lines WL1 to WL16. A group of the memory cells connected to the same word line among the memory cells in different strings ST may be referred to as a page PG. Therefore, the memory block BLKi may include the pages PG of the number of the word lines WL1 to WL16.

In one embodiment, one memory cell may store one bit of data. This is commonly called a single level cell (SLC). In this case, one physical page PG may store one logical page (LPG) data. The one logical page (LPG) data may include data bits of the same number as cells included in one physical page PG. In other embodiments, one memory cell may store two or more bits of data. In this case, one physical page PG may store two or more logical page (LPG) data.

Figure 4:
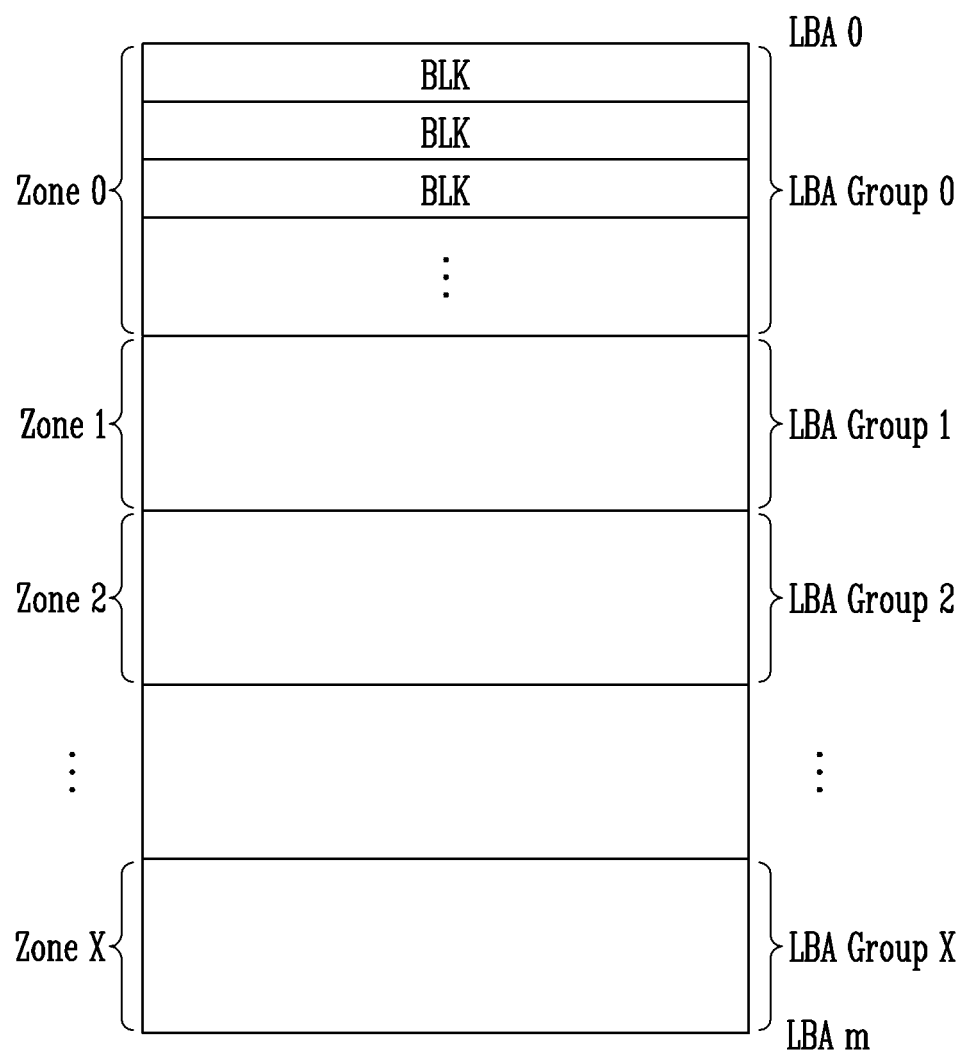
FIG. 4 illustrates an embodiment of a storage area.

FIG. 4 is a diagram illustrating an embodiment of a storage area of the storage device. The storage area of the storage device may be divided into a plurality of sequential areas. In this embodiment, it is assumed that logical addresses to be provided by host 400 are from a first logical address LBA 1 to an m-th logical address LBA m.

Referring to FIG. 4, data corresponding to the first logical address LBA 1 to the m-th logical address LBA m may be stored in a Zone0 to a Zone X that are the sequential areas.

Logical addresses of the data stored in Zone0 may be a logical address group 0 LBA Group0. Logical addresses of the data to be respectively stored in Zone1 to ZoneX may be logical address group 1 to logical address group X LBA Group 1 to LBA GroupX. Logical addresses in the logical address group to be stored in each of the zones may be defined by the host 400 when the zone is opened. In an embodiment, capacities of the zones may be different, and the capacity of the zones may be determined, for example, according to the number (e.g., length) of the logical addresses to be stored in each zone. As a result, the number of memory blocks allocated to each zone may be different.

Figure 5:
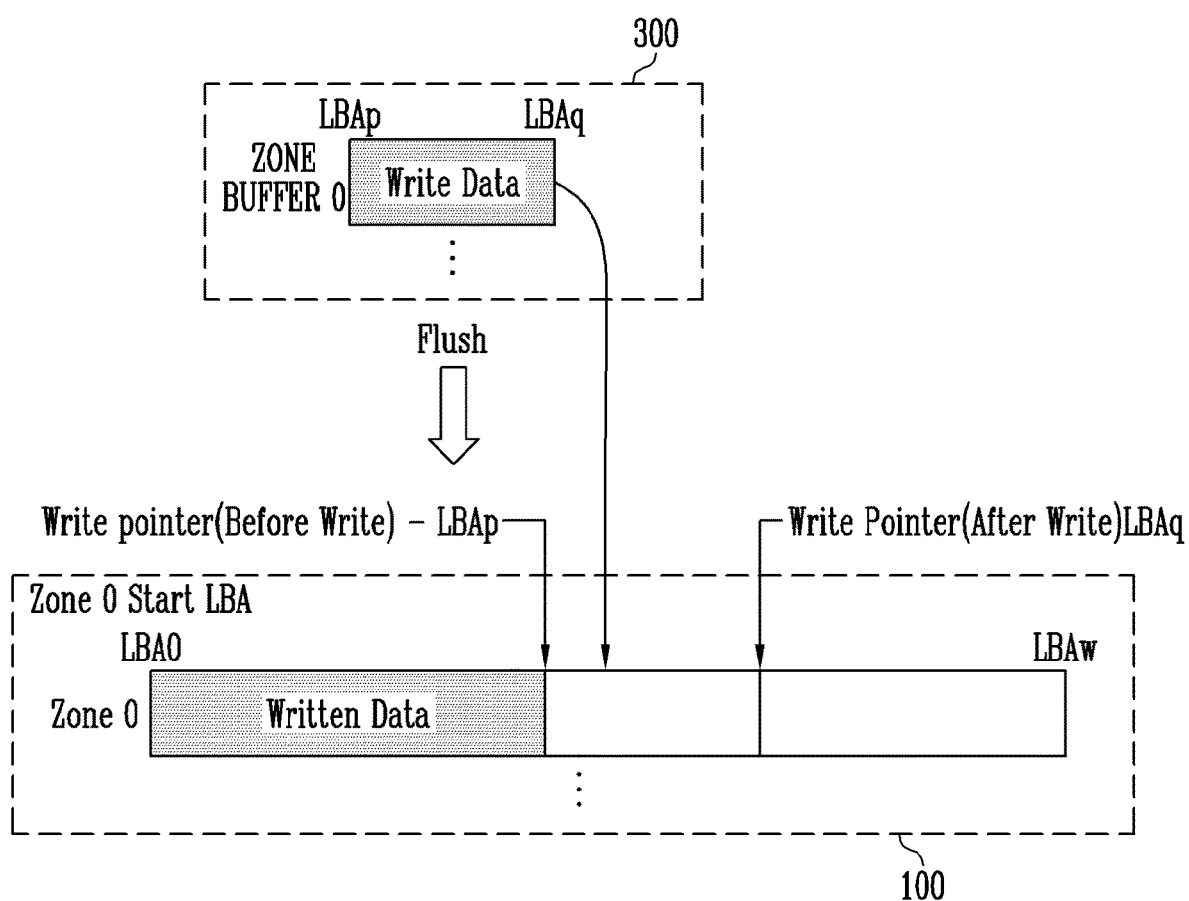
FIG. 5 illustrates an embodiment for storing data in a zone.

FIG. 5 is a diagram illustrating an embodiment of a process of storing data in a zone. In this embodiment, it is assumed that Zone 0 is a sequential area to store data corresponding to LBA0 to LBAw. For example, a start address of Zone 0 may be LBA0.

Referring to FIG. 5, zone buffer 0 may temporarily store data to be stored in Zone 0 and may be allocated to the buffer memory device 300. Data corresponding to LBA0 to LBAp−1 may already be stored in Zone 0. When the zone buffer 0 is filled with data or when a flush command is received from host 400, the operation controller 220 (e.g., as described with reference to FIG. 1) may control the memory device 100 and the buffer memory device 300 to perform a program operation of storing data corresponding to LBAp to LBAq temporarily stored in zone buffer 0 in Zone 0.

When the data corresponding to LBAp to LBAq is stored in Zone 0, the zone manager 210 may perform an update so that write pointer information in a descriptor of Zone 0 indicates LBAq+1. Thereafter, zone manager 210 may control the memory device 100 and the buffer memory device 300 to store a zone descriptor stored in a zone descriptor storage 320 in the meta data block of the memory device 100.

Figure 6:
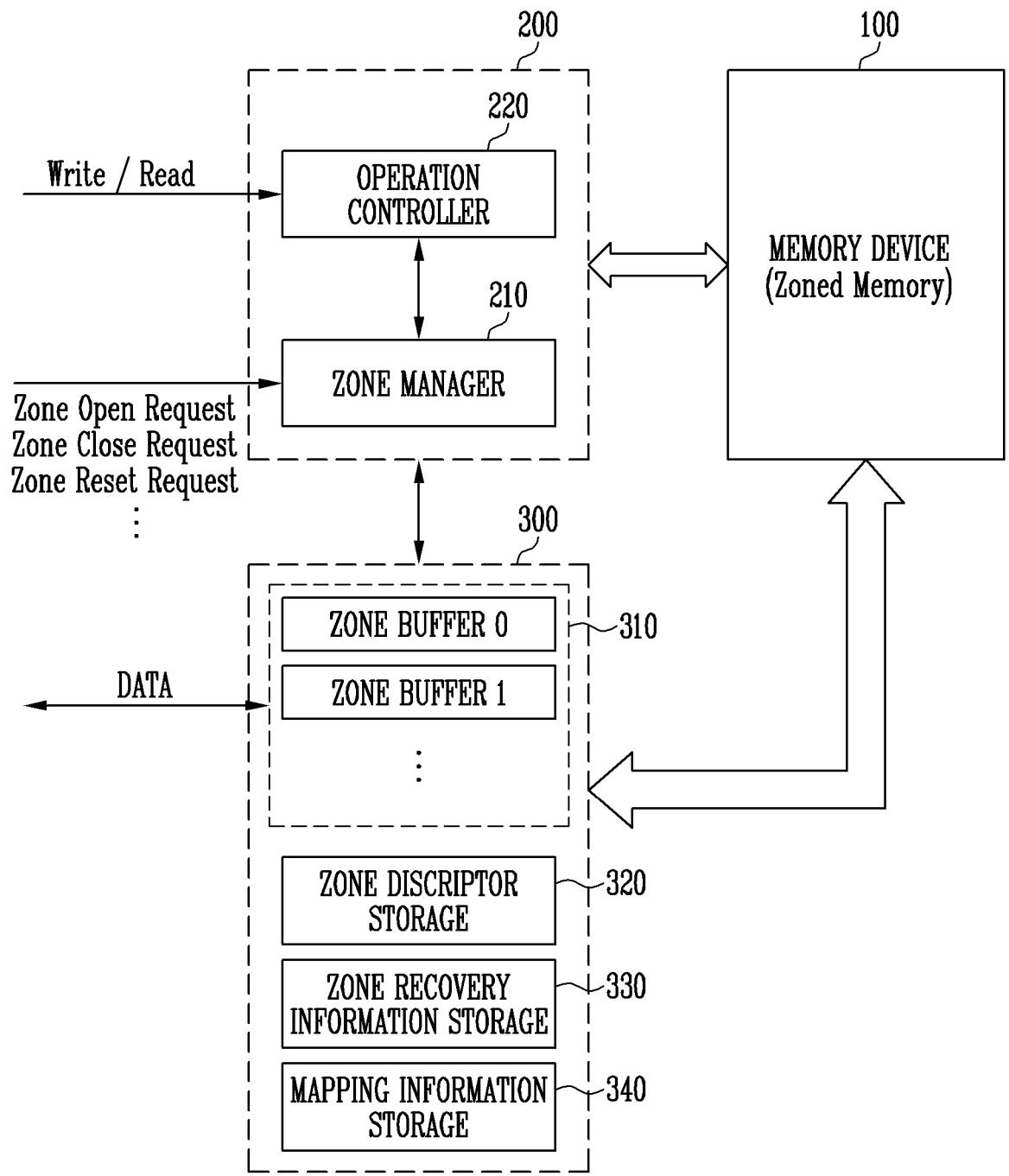
FIG. 6 illustrates an embodiment for operating a storage device.

FIG. 6 is a diagram illustrating an embodiment of an operation of a storage device. Referring to FIG. 6, the memory device 100 may be a memory (zoned memory) divided into zones including a plurality of memory blocks each included in a plurality of zones.

The memory controller 200 may control the memory device 100 and the buffer memory device 300. The memory controller 200 may include zone manager 210 and operation controller 220. The zone manager 210 may manage overall operation related to generation, state change, and/or removal of the zones. The zone manager 210 may receive zone control commands from the host 400, for example, as described with reference to FIG. 1.

The zone control commands may control the state of the zone. For example, the zone control command may include a zone open request Zone Open Request, a zone close request Zone Close Request, and a zone reset request Zone Reset Request.

The Zone Open Request may include an instruction to open the zone. In response to the Zone Open Request, the zone manager 210 may open the zone. When receiving the Zone Open Request, the zone manager 210 may allocate a zone buffer (e.g., a buffer that temporarily stores data to be stored in an open-requested zone) in a zone write buffer 310 of the buffer memory device 300.

The Zone Open Request may include the zone number, the write pointer position information, the start address information, the zone capacity information, and the zone recovery information. The zone number may identify the zone. The write pointer position information may indicate a write pointer position of a corresponding zone. The write pointer position may indicate a logical address of data to be stored. The start address information may be a start logical address of the logical address group corresponding to the data to be stored in the zone. The start address information and the write pointer position information in the zone open request Zone Open Request for first opening the zone may indicate the same logical address.

The zone recovery information may indicate whether the data stored in the open-requested zone is data to be recovered in the next power cycle. For example, storage device 50 may maintain data stored in a zone corresponding to the zone recovery information, indicating the zone that is to be recovered, until the host 400 discards the corresponding data. Conversely, the data stored in the zone corresponding to the zone recovery information, indicating that the zone that is not to be recovered, may have to be maintained until power is turned off, but may not be the data that is to be recovered when power is applied again.

In response to the Zone Open Request, the zone manager 210 may generate a zone descriptor including information on the open-requested zone. The zone manager 210 may store the generated zone descriptor in the zone descriptor storage 320. The zone descriptor may include data related to the zone. In an embodiment, the zone descriptor may include the zone number, the zone state information, the write pointer position information, the start address information, and the zone capacity information.

The zone manager 210 may store the zone recovery information included in the Zone Open Request in the zone recovery information storage 330.

The zone close request Zone Close Request may be a request instructing to change the state of the open zone to a closed state. In response to the Zone Close Request, the zone manager 210 may deallocate a resource allocated to a close-requested zone of the storage device 50. For example, the zone manager 210 may deallocate a zone buffer corresponding to the close-requested zone. Read access is possible with respect to data stored in the zone of the closed state, but in order to store the data in the zone of the closed state the Zone Open Request requesting to open the corresponding zone again may have to be provided from the host 400.

The zone reset request Zone Reset Request may be an operation of changing a position of a write pointer of a reset-requested zone to a position of a start address. In response to the Zone Reset Request, the zone manager 210 may initialize the position of the write pointer of the reset-requested zone. The zone in which the position of the write pointer is initialized may be in the same state as the first open state. Therefore, a data block previously stored in the corresponding zone may be erased.

The zone manager 210 may update the zone descriptor stored in the zone descriptor storage 320 when the position of the write pointer is changed due to storage of the data in the zone, or when the state of the zones or information of the zones is changed according to an input of the zone control command.

When the zone descriptors stored in the zone descriptor storage 320 are updated, the zone manager 210 may store the zone descriptors in a meta data block in the memory device 100. For example, the zone manager 210 may control the buffer memory device 300 and the memory device 100 to, periodically or aperiodically, store zone meta data in the meta data block among the plurality of memory blocks in the memory device 100. The zone metadata may include the zone descriptor and the zone recovery information.

In an embodiment, the buffer memory device 300 may further include a mapping information storage 340. The mapping information storage 340 may include information on a physical address of a memory block allocated to each zone. In an embodiment, the mapping information storage 340 may further include information on a physical address corresponding to the position of the write pointer. In an embodiment, the information on the physical address stored in the mapping information storage 340 may be stored together in the zone descriptor storage 320, differently from that shown in FIG. 6.

When power is supplied to the storage device 50, the zone manager 210 may load the zone recovery information (among the zone meta data stored in the meta data block in the memory device 100) into the zone recovery information storage 330. The zone manager 210 may selectively recover the zones based on the zone recovery information.

The zone manager 210 performs a zone recovery operation on the zone to be recovered. The zone recovery operation may include loading the zone descriptor of the zone to be recovered into the zone descriptor storage 320 and allocating the zone buffer corresponding to the zone to be recovered to the zone write buffer 310. The zone manager 210 may discard the zone descriptor of the zone that is not to be recovered and may erase data stored in the zone that is not to be recovered.

The operation controller 220 may control the buffer memory device 300 and memory device 100 to store write data in a zone corresponding to a logical address of write-requested write data provided from the host 400. In an embodiment, the operation controller 220 may provide the write data to the memory device 100 in a program unit size of the memory device 100. The program unit size may be a size of data that may be stored in the memory device 100 according to one program operation.

FIG. 7 is a diagram illustrating examples of zone descriptors that may be stored in the zone descriptor storage 320 of FIG. 6.

Referring to FIG. 7, the zone descriptor storage 320 may include a plurality of zone descriptors. Each zone descriptor may include a zone number, zone state information, write pointer position information, start address information, and zone capacity information. The zone number may identify the zone. The zone state information may indicate whether a current state of the zone is the open state or the closed state. The write pointer position information may indicate a logical address corresponding to a position of a write pointer of each current zone. The start address information may include a first logical address among the logical addresses in the logical address group of the data to be stored in each zone. The zone capacity information may indicate a size of a data storage capacity of each zone.

FIG. 8 is a diagram illustrating an example of zone recovery information that may be stored in the zone recovery information storage 330 of FIG. 6.

Referring to FIGS. 6 and 8, the zone recovery information may include recovery information of each zone. For example, Zone0, Zone2, and Zone3 may be recovery targets (Recovery). In addition, Zone1 and Zone4 may not be recovery targets (No Recovery).

When power is supplied to the storage device 50, the zone manager 210 may load zone recovery information (from among the zone meta data stored in the meta data block in the memory device 100) into the zone recovery information storage 330. The zone manager 210 may selectively recover the zones based on the zone recovery information.

The zone manager 210 may read the zone descriptors of Zone0, Zone2, and Zone3, which are recovery targets, and may store the zone descriptors in the zone descriptor storage 320.

In addition, the zone manager 210 may allocate zone buffers respectively corresponding to Zone0, Zone2, and Zone3 in the zone write buffer 310. In an embodiment, the zone manager 210 may allocate the zone buffer only to the zones in which the zone state information in the zone descriptor is in the open state.

The zone manager 210 may discard the zone descriptors of Zone1 and Zone4, which are not the recovery targets, and erase data stored in Zone1 and Zone4. For example, the zone manager 210 may control the memory device 100 to perform an erase operation on memory blocks allocated to Zone1 and Zone4. In one embodiment, the data stored in Zone1 and Zone4 may be related to performance improvement of the host 400 or the storage device 50, rather than the user data. The data stored in Zone1 and Zone4 may be related to a different information in another embodiment.

Figure 9:
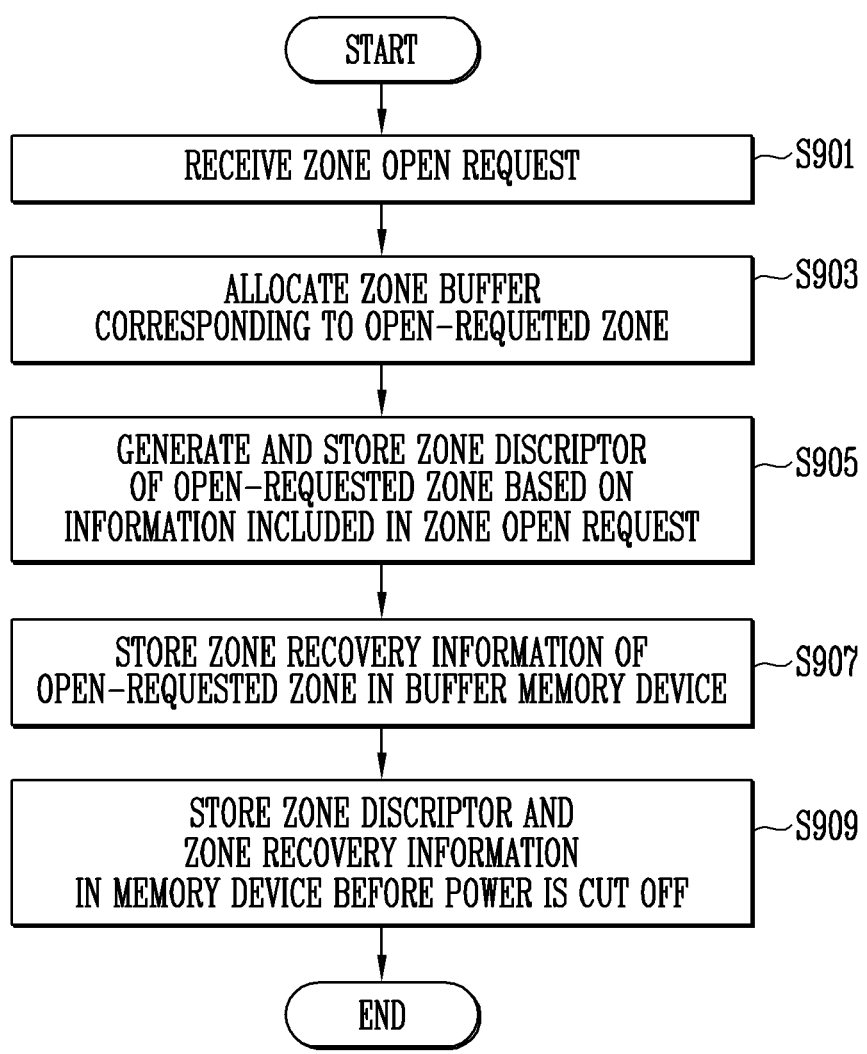
FIG. 9 illustrates an embodiment of a method of operating a storage device.

FIG. 9 is a flowchart illustrating an embodiment of a method of operating a storage device, which, for example, may correspond to any of the embodiments of the storage device described herein.

Referring to FIG. 9, in operation S901, the storage device may receive the zone open request from the host.

In operation S903, the storage device may allocate the zone buffer as or corresponding to a buffer to be stored in the open-requested zone.

In operation S905, the storage device may generate the zone descriptor of the open-requested zone based on information in the zone open request, and may store the generated zone descriptor in the buffer memory device.

In operation S907, the storage device may store the zone recovery information, in the zone open request, in the zone recovery information storage of the buffer memory device.

In operation S909, the storage device may store the zone descriptor and the zone recovery information, stored in the buffer memory device, in the memory device before the power is cut off.

Figure 10:
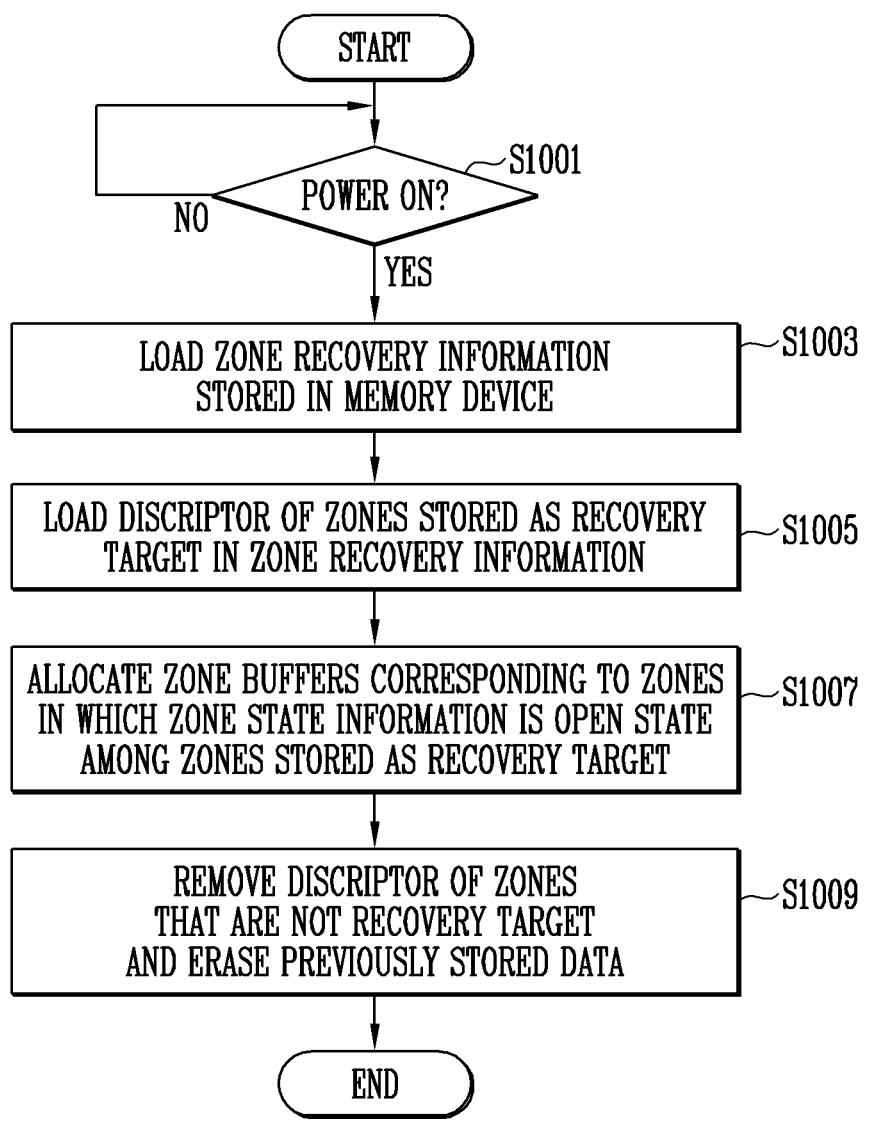
FIG. 10 illustrates an embodiment of a method of operating a storage device.

FIG. 10 is a flowchart illustrating an embodiment of a method of operating a storage device.

Referring to FIG. 10, in operation S1001, the storage device may sense input of power.

In operation S1003, the storage device may load the zone recovery information, stored in the memory device, into the buffer memory device.

In operation S1005, the storage device may read the zone descriptors (of the zones stored as the recovery targets in the zone recovery information) from the memory device and may store the zone descriptors in the buffer memory device.

In operation S1007, the storage device may allocate the zone buffers respectively corresponding to the zones in which the zone state information in the zone descriptor is the open state.

In operation S1009, the storage device may remove zone descriptors of the zones that are not the recovery targets, and may erase the data previously stored in the corresponding zone.

Figure 11:
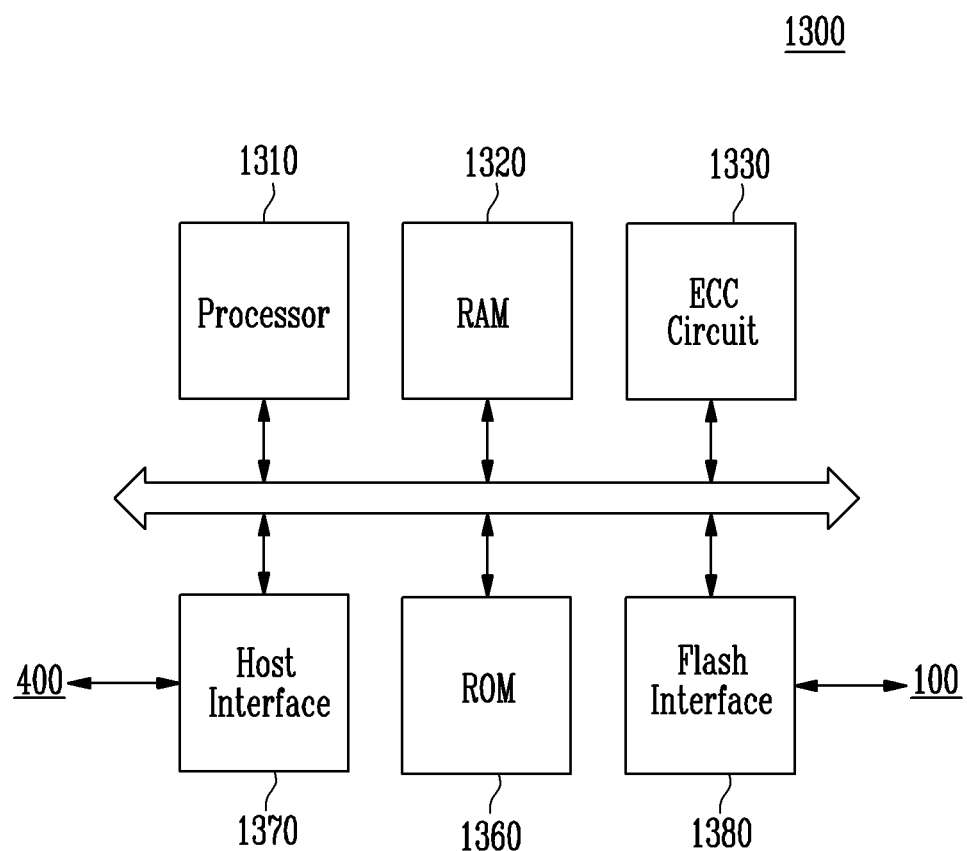
FIG. 11 illustrates an embodiment of a memory controller.

FIG. 11 is a diagram illustrating an embodiment of a memory controller 1300, which, for example, may correspond to any of the embodiments of the memory controller described herein.

Referring to FIGS. 1 and 11, memory controller 1300 may include a processor 1310, a RAM 1320, an error correction circuit 1330, a ROM 1360, a host interface 1370, and a flash interface 1380. The processor 1310 may control overall operation of the memory controller 1300. The RAM 1320 may be used, for example, as a buffer memory, a cache memory, an operation memory, and the like, of the memory controller 1300. The ROM 1360 may store various information (e.g., instructions such as firmware) for operation of the memory controller 1300.

The memory controller 1300 may communicate with an external device (for example, host 400, an application processor, or another device) through the host interface 1370.

The memory controller 1300 may communicate with the memory device 100, for example, through flash interface 1380. The memory controller 1300 may transmit commands CMD, addresses ADDR, control signals CTRL, and/or other information and signals, to the memory device 100, and may receive data DATA through the flash interface 1380. The flash interface 1380 may include, for example, a NAND interface.

Figure 12:
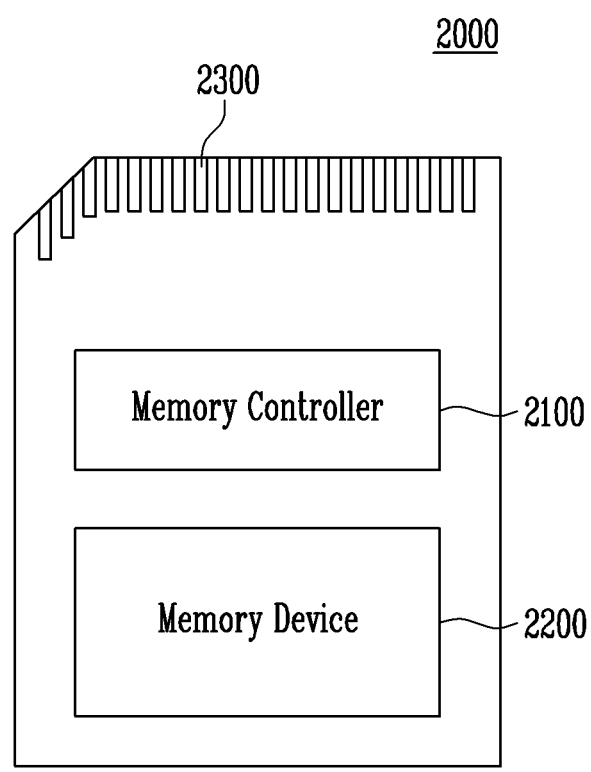
FIG. 12 illustrates an embodiment of a memory card.

FIG. 12 is a block diagram illustrating an embodiment of a memory card system 2000 to which any of the embodiments of the storage device described herein may be applied.

Referring to FIG. 12, the memory card system 2000 includes a memory controller 2100, a memory device 2200, and a connector 2300. The memory controller 2100 is connected to access the memory device 2200 and, for example, may be configured to control read, write, erase, and background operations of the memory device 2200. In one embodiment, the memory controller 2100 may serve as an interface between the memory device 2200 and a host. The memory controller 2100 is configured to drive firmware for controlling the memory device 2200, and, for example, may be implemented to correspond to memory controller 200 described with reference to FIG. 1.

The memory controller 2100 may include, for example, components such as a random access memory (RAM), a processor, a host interface, a memory interface, and an error corrector.

The memory controller 2100 may communicate with an external device through the connector 2300. The memory controller 2100 may communicate with an external device (for example, the host) according to at least a one communication standard or protocol. Examples include a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe. The connector 2300 may be defined, for example, by at least one of these communication standards or protocols.

The memory device 2200 may include, for example, various nonvolatile memory elements. Examples include an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

In one embodiment, the memory controller 2100 and the memory device 2200 may be integrated into one semiconductor device to configure a memory card. Examples of the memory card include a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
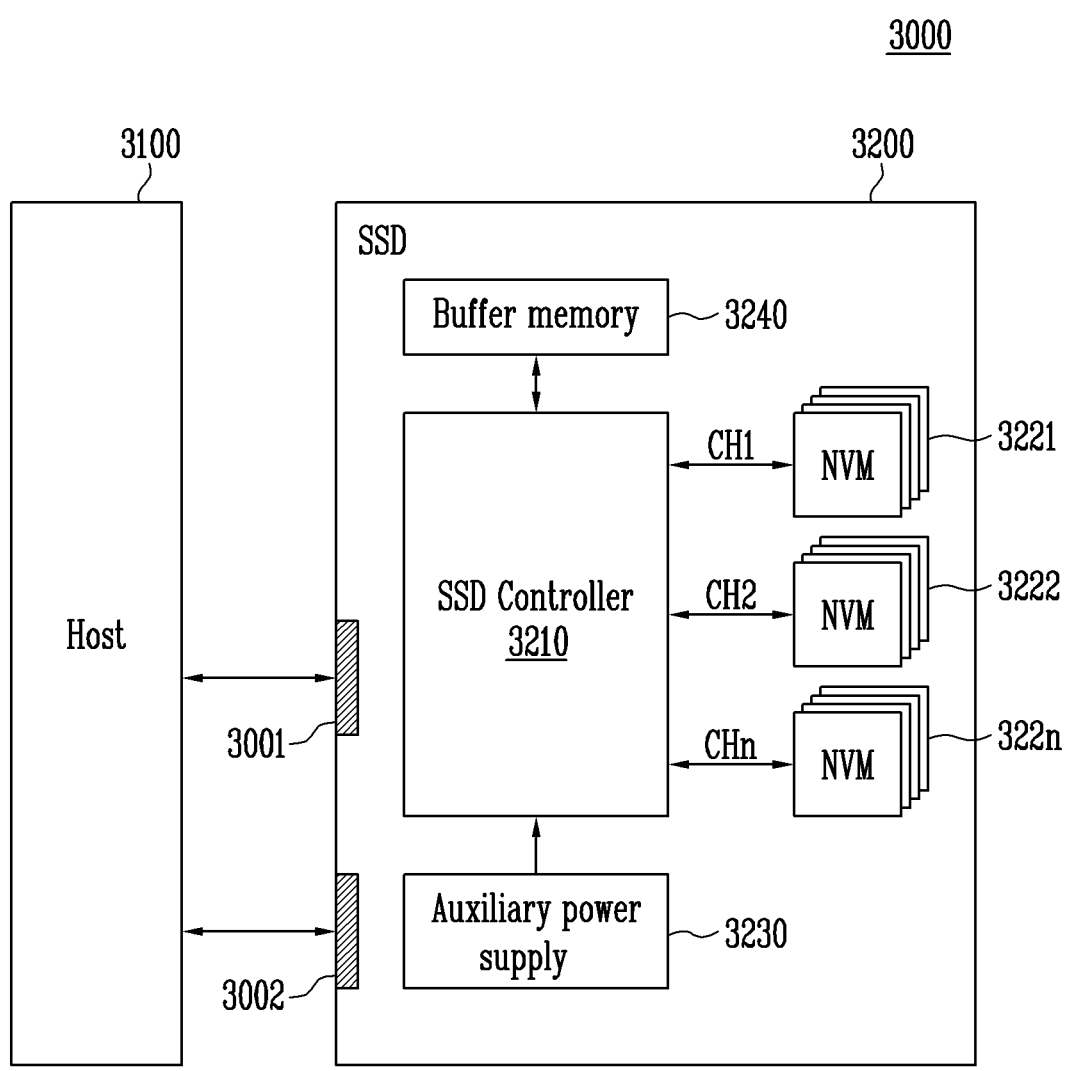
FIG. 13 illustrates an embodiment of a solid state drive.

FIG. 13 is a block diagram illustrating an embodiment of a solid state drive (SSD) system 3000, to which embodiments of the storage device described herein may be applied.

Referring to FIG. 13, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240. According to an embodiment, the SSD controller 3210 may perform the function of the memory controller 200 described with reference to FIG. 1.

The SSD controller 3210 may control the plurality of flash memories 3221 to 322n in response to a signal SIG received from the host 3100. The signal SIG may be one of various types of signals based on an interface between host 3100 and SSD 3200. For example, the signal SIG may correspond to at least one of various types of interfaces. Examples include a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive power PWR from the host 3100 and may perform a charging operation based on the power. The auxiliary power device 3230 may provide power of the SSD 3200 when power supply from the host 3100 does not correspond to a predetermined level or pattern, e.g., is not smooth. For example, the auxiliary power device 3230 may be positioned in the SSD 3200 or may be outside the SSD 3200 and coupled thereto. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 and/or data received from the plurality of flash memories 3221 to 322n, and/or may temporarily store meta data (for example, a mapping table) of the flash memories 3221 to 322n. The buffer memory 3240 may include a volatile memory. Examples include a DRAM, an SDRAM, a DDR SDRAM, an LPDDR SDRAM, and a GRAM, or a nonvolatile memory such as an FRAM, a ReRAM, an STT-MRAM, and a PRAM.

Figure 14:
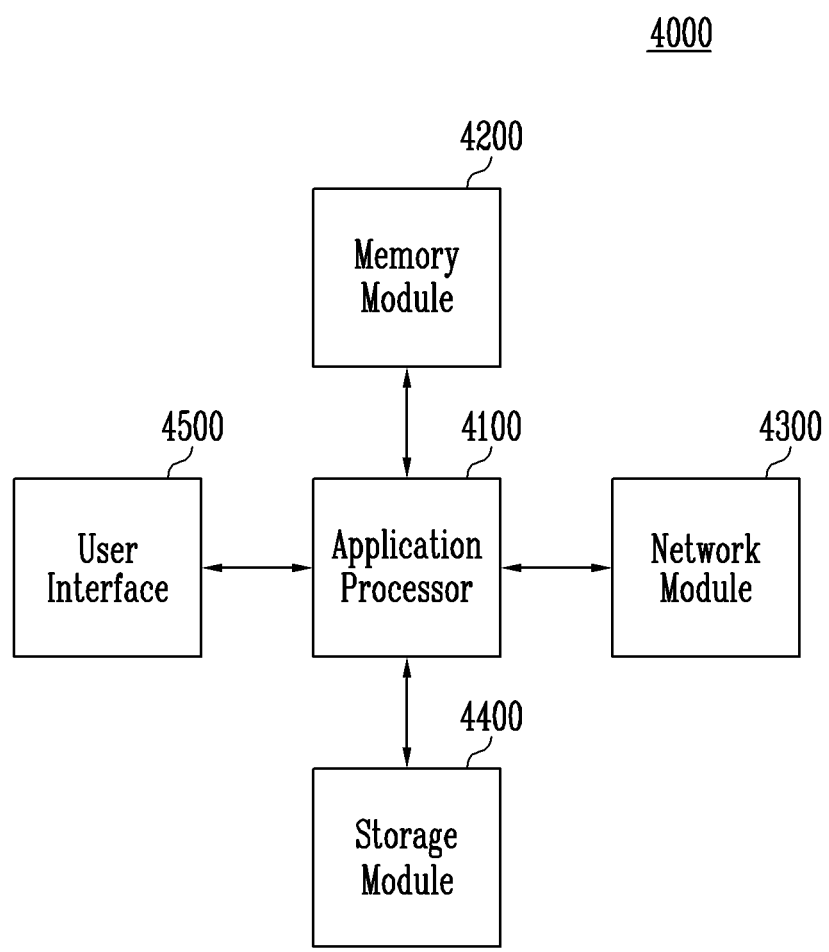
FIG. 14 illustrates an embodiment of a user system.

FIG. 14 is a block diagram illustrating an embodiment of a user system 4000, to which any of the embodiments of the storage device described herein may be applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, and/or other features in the user system 4000. For example, the application processor 4100 may include one or more of controllers, interfaces, graphics engines, and/or other features that control components in the user system 4000. In one embodiment, the application processor 4100 may be provided as a system-on-chip (SoC).

The memory module 4200 may operate, for example, as a main memory, an operation memory, a buffer memory, or a cache memory of the user system 4000. The memory module 4200 may include a volatile random access memory (e.g., DRAM, SDRAM, DDR SDRAM, DDR2 SDRAM, DDR3 SDRAM, LPDDR SDARM, LPDDR2 SDRAM, LPDDR3 SDRAM, etc.) or a nonvolatile random access memory (e.g., PRAM, ReRAM, MRAM, FRAM, etc.). The application processor 4100 and memory module 4200 may be packaged, for example, based on a package on package (POP) or may be provided as one semiconductor package.

The network module 4300 may communicate with external devices, and, for example, may support one or more types of wireless communications. Examples include code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be in the application processor 4100.

The storage module 4400 may store data. For example, the storage module 4400 may store data received from the application processor 4100. In one embodiment, the storage module 4400 may transmit data stored in the storage module 4400 to the application processor 4100. The storage module 4400 may be implemented, for example, as a nonvolatile semiconductor memory element. Examples include a phase-change RAM (PRAM), a magnetic RAM (MRAM), a resistive RAM (ReRAM), a NAND flash, a NOR flash, and a three-dimensional NAND flash. The storage module 4400 may correspond, for example, to a removable storage device (e.g., removable drive), which, for example, may be a memory card, or an external drive of the user system 4000.

The storage module 4400 may include a plurality of nonvolatile memory devices, which, for example, may operate as the memory device 100 described with reference to FIG. 1. In one embodiment, the storage module 4400 may operate as the storage device 50 described with reference to FIG. 1.

The user interface 4500 may include one or more interfaces for inputting data or instructions to the application processor 4100 and/or for outputting data to an external device. For example, the user interface 4500 may include one or more user input interfaces. Examples include a keyboard, a keypad, a button, a touch panel, a touch screen, a touch pad, a touch ball, a camera, a microphone, a gyroscope sensor, a vibration sensor, and a piezoelectric element. The user interface 4500 may include one or more user output interfaces. Examples include a liquid crystal display (LCD), an organic light emitting diode (OLED) display device, an active matrix OLED (AMOLED) display device, an LED, a speaker, and a monitor.

In accordance with one embodiment, an apparatus includes a storage area and a memory controller. The storage area is configured to store instructions, and the memory controller is configured to execute the instructions to control a memory device to perform an allocation operation and a storage operation. The apparatus and/or memory controller may be in a storage device including the memory device or may be coupled to a storage device including the memory device. In one embodiment, the storage area is a non-transitory computer-readable medium which, for example, may correspond to ROM 1360 or another storage area within or coupled to the apparatus or memory controller. The memory controller and memory device may correspond, for example, to any of the embodiments described herein.

The allocation operation may include allocating memory blocks to store data of a logical address group corresponding to an open-requested zone. The storage operation may include storing, in the memory device, zone recovery information included in a zone open request. In one embodiment, the memory controller may allocate the memory blocks and store the zone recovery information in response to the zone open request. The zone recovery information may indicate whether data to be stored in the open-requested zone is to be recovered in a next power cycle.

In one embodiment, a non-transitory computer-readable medium may store instructions which cause a processor to perform the allocation and storage operations mentioned above, along with their attendant features. The non-transitory computer-readable medium may be any type of volatile or non-volatile memory and the processor may be one which, for example, corresponds to the memory controller as described herein.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described, code or instructions for implementing the operations of the method embodiments may transform the computer, processor, controller, or other signal processing device into a special-purpose processor for performing the methods herein.

When implemented in at least partially in software, the controllers, processors, devices, components, modules, units, multiplexers, generators, logic, interfaces, decoders, drivers and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate understanding of the present disclosure, and are not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Embodiments may be combined to form additional embodiments.

What is claimed is:

1. A storage device comprising:
   a memory device including a plurality of memory blocks; and
   a memory controller configured to, in response to a zone open request, allocate memory blocks to store data of a logical address group corresponding to each of open-requested zones among the plurality of memory blocks, and control the memory device to store zone recovery information included in the zone open request,
   wherein the zone recovery information indicates volatile zones among the open-requested zones, and
   wherein the memory controller determines data to be stored in one or more zones to be recovered in a next power cycle and recovers the data stored in the one or more zones other than the volatile zones among the open-requested zones, based on the zone recovery information.

2. The storage device of claim 1, further comprising:
   a buffer memory device configured to temporarily store data that has been requested to be written.

3. The storage device of claim 2, wherein the memory controller comprises:
   a zone manager configured to allocate, in the buffer memory device, a zone buffer to temporarily store the data of the logical address group corresponding to each of the open-requested zones, in response to the zone open request; and
   an operation controller configured to control the memory device to store, in the memory blocks allocated to the open-requested zones, the data of the logical address group corresponding to the open-requested zones.

4. The storage device of claim 3, wherein the zone open request includes:
   zone numbers identifying the open-requested zones;
   write pointer position information indicating a logical address to be stored in the open-requested zones;
   start address information of the logical address group corresponding to each of the open-requested zones;
   zone capacity information indicating a storage capacity of the open-requested zones; and
   the zone recovery information.

5. The storage device of claim 4, wherein the zone manager is configured to generate a zone descriptor including the zone number, zone state information indicating a state of the zone, the write pointer position information, the start address information, and the zone capacity information.

6. The storage device of claim 5, wherein the buffer memory device further comprises:
a zone descriptor storage configured to temporarily store the zone descriptor; and
a zone recovery information storage configured to temporarily store the zone recovery information.

7. The storage device of claim 6, wherein
before power is cut off to the storage device, the zone manager is configured to control the memory device to store, in the memory device, data which is stored in the zone descriptor storage and the zone recovery information storage.

8. A storage device comprising:
a memory device including a plurality of zones respectively corresponding to logical address groups, each of the logical address groups including successive logical addresses and a meta data block storing meta data related to the plurality of zones;
a buffer memory device configured to temporarily store data received from a source device or the memory device; and
a memory controller configured to, when power is applied, load zone recovery information included in the meta data block into the buffer memory device, and to selectively recover data stored in one or more zones other than volatile zones among the plurality of zones based on the zone recovery information indicating the volatile zones among the plurality of zones.

9. The storage device of claim 8, wherein the zone recovery information includes information on zones that are to be recovered and zones that are not to be recovered among the plurality of zones.

10. The storage device of claim 9, wherein the memory controller is configured to load, into the buffer memory device, zone descriptors corresponding to the zones to be recovered among data included in the meta data.

11. The storage device of claim 10, wherein the zone descriptors include a zone number, zone state information, write pointer position information, start address information, and zone capacity information of the zones to be recovered.

12. The storage device of claim 11, wherein
the memory controller is configured to allocate, in the buffer memory device, zone buffers, respectively corresponding to zones in which the zone state information is open, among the zones to be recovered, based on the zone descriptors.

13. The storage device of claim 9, wherein the zones that are not to be recovered stores data related to performance of a host or the storage device.

14. A storage device comprising:
a memory device including a plurality of zones configured to store data corresponding to logical address groups, each of the logical address groups including successive logical addresses;
a buffer memory device including a zone recovery information storage configured to store zone recovery information indicating volatile zones among the plurality of zones; and
a memory controller configured to:
store, in a meta data block included in the memory device, data stored in the zone recovery information storage before power is cut off;
load, into the zone recovery information storage, zone recovery information stored in the meta data block, when power is supplied again after the power is cut off; and
recover, based on the zone recovery information, data stored in one or more zones other than the volatile zones among the plurality of zones.

15. The storage device of claim 14, wherein the meta data block includes zone descriptors corresponding to the plurality of zones.

16. The storage device of claim 15, wherein the memory controller is configured to load, into the buffer memory device, zone descriptors corresponding to the zones other than the volatile zones among the plurality of zones.

17. The storage device of claim 14, wherein the memory controller is configured to erase, based on the zone recovery information, data stored in the volatile zones among the plurality of zones.

18. The storage device of claim 1, wherein the volatile zones store data which is destroyed every power cycle.

19. The storage device of claim 8, wherein the volatile zones store data which is destroyed every power cycle.

20. The storage device of claim 14, wherein the volatile zones store data which is destroyed every power cycle.

* * * * *